Dec. 10, 1957 — H. G. BUSH — 2,815,634
ROTARY LAWN MOWER
Filed Jan. 30, 1956 — 4 Sheets-Sheet 1

INVENTOR.
HEROLD G. BUSH
BY
ATTORNEYS.

Dec. 10, 1957   H. G. BUSH   2,815,634
ROTARY LAWN MOWER
Filed Jan. 30, 1956   4 Sheets-Sheet 2

INVENTOR.
HEROLD G. BUSH
BY
Barnes, Kisselle, Laughlin & Raisch
ATTORNEYS.

Dec. 10, 1957 H. G. BUSH 2,815,634
ROTARY LAWN MOWER
Filed Jan. 30, 1956 4 Sheets-Sheet 3

INVENTOR.
HEROLD G. BUSH
BY
Barnes, Kisselle, Laughlin & Raisch
ATTORNEYS.

Dec. 10, 1957          H. G. BUSH          2,815,634
ROTARY LAWN MOWER

Filed Jan. 30, 1956          4 Sheets—Sheet 4

INVENTOR.
HEROLD G. BUSH
BY
Barnes, Kisselle, Laughlin & Raisch
ATTORNEYS.

U̇nited States Patent Office 2,815,634
Patented Dec. 10, 1957

2,815,634

ROTARY LAWN MOWER

Herold G. Bush, Lansing, Mich., assignor to Motor Wheel Corporation, Lansing, Mich., a corporation of Michigan Application January 30, 1956, Serial No. 562,288

6 Claims. (Cl. 56—25.4)

This invention relates to lawn mowers and particularly to rotary lawn mowers which utilize a cutting blade rotatable about a vertical axis.

In rotary lawn mowers where a single cutting blade is used, the width of the cutting swath is determined by the length of the blade. Thus, if a mower of this type is designed to cut a relatively wide swath, the length of the blade is relatively great. Such mowers are not only unwieldy, but since the distance between wheel centers is necessarily relatively great, on uneven ground, scalping or slicing off of the high spots of the lawn is unavoidable. It has been proposed heretofore to provide a rotary mower with a plurality of relatively small blades arranged in staggered relation so as to present a series of overlapping successive swaths. Mowers of the latter type present somewhat the same disadvantages inherent in the single blade mowers, that is, they are large, bulky and produce scalping on uneven ground.

It is an object of this invention to provide a rotary lawn mower which will cut a relatively wide swath and which at the same time is relatively small and compact.

It is a further object of this invention to provide such a lawn mower which cuts grass efficiently and does not produce windrowing.

Figure 5:
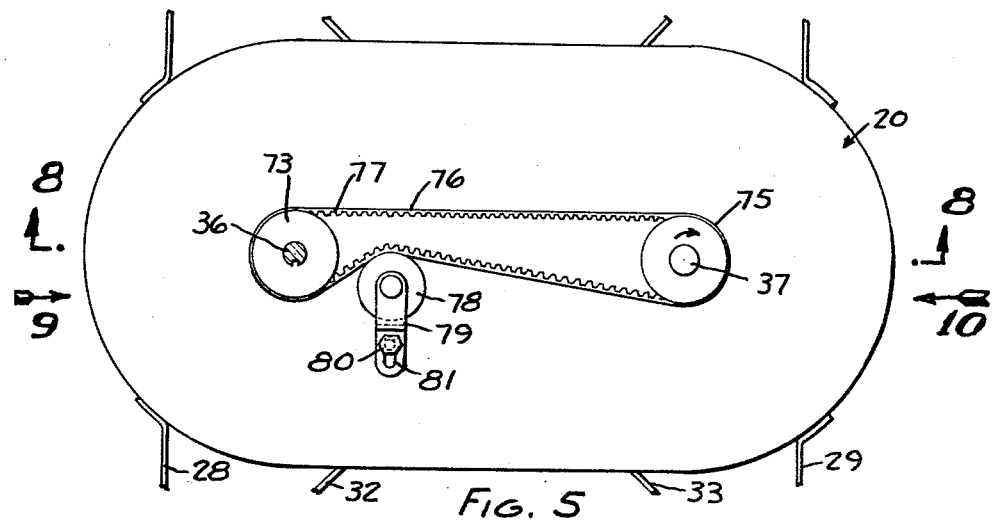
Fig. 5 is a fragmentary plan view similar to Fig. 2 on a slightly enlarged scale, parts being broken away.
Figures 9, 10:
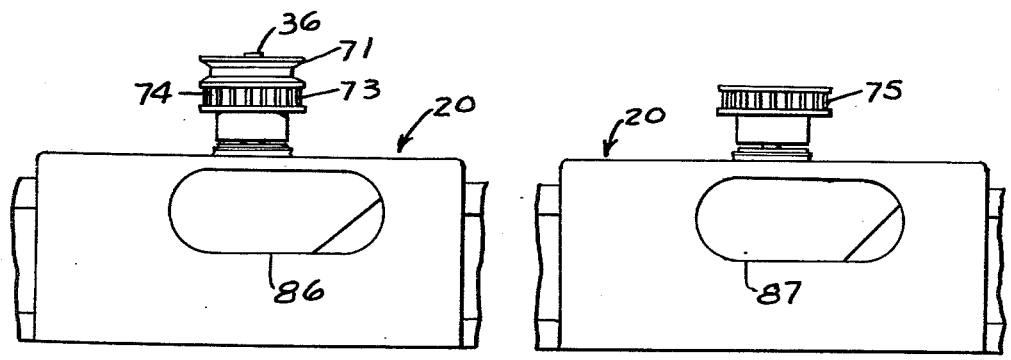

Figs. 9 and 10 are fragmentary side elevational views as viewed in the direction of the arrows 9 and 10, respectively, in Fig. 5.

Figures 1, 2:
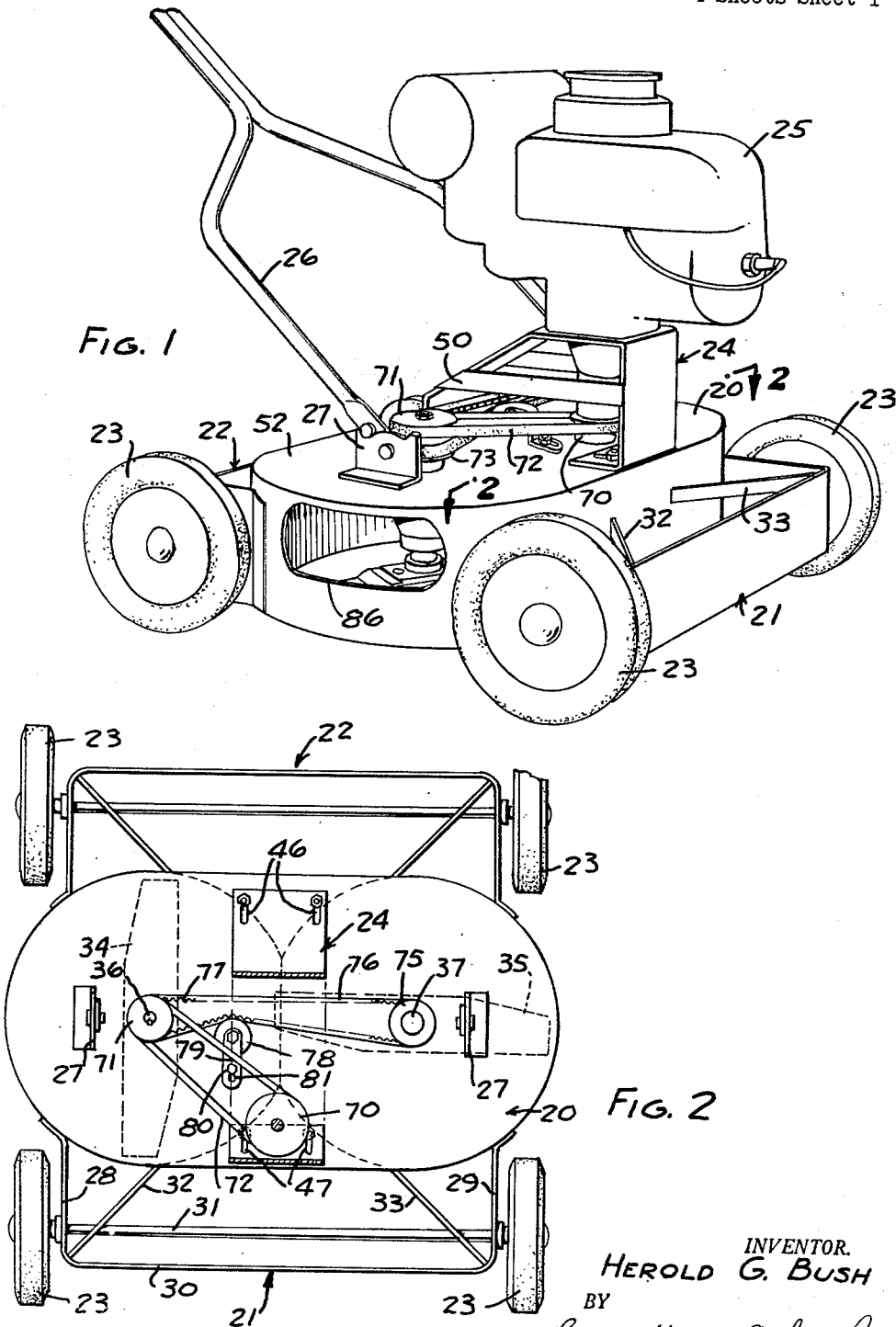
Fig. 1 is a perspective view of a lawn mower embodying the invention.
Fig. 2 is a horizontal sectional view, with parts broken away, taken along the line 2—2 on Fig. 1.

Referring to Fig. 1, the lawn mower comprises a housing 20 having a forward extension 21 and a rear extension 22 on which are rotatably mounted wheels 23 so that the housing may be moved along the ground. A bracket 24 is mounted on the housing 20 and supports a small engine 25 which may be of the electric or internal combustion type. A handle 26 is pivotally connected to brackets 27 mounted on the housing 20, for guiding or pushing the lawn mower along the ground.

As shown in Fig. 2, the extensions 21, 22 are identical and each comprises short longitudinally extending side walls 28, 29 on either side of the housing connected by a transverse vertical end wall 30. Front and rear axles 31 which support the wheels extend horizontally through the walls 28, 29 and the wheels 23 are mounted on the ends thereof. Diagonal braces 32, 33 are provided between the housing 20 and the end walls 30 to strengthen the extensions.

Rotary cutting blades 34, 35 are mounted for rotation in the same horizontal plane within the housing 20 on laterally spaced vertical shafts 36, 37 journalled on housing 20 as presently described. The vertical shafts 36, 37 are positioned in a transverse plane generally perpendicular to the line of movement of the lawn mower along the ground. The length of the rotary blades 34, 35 is such that the orbits of the rotary blade tips overlap.

Figure 3:
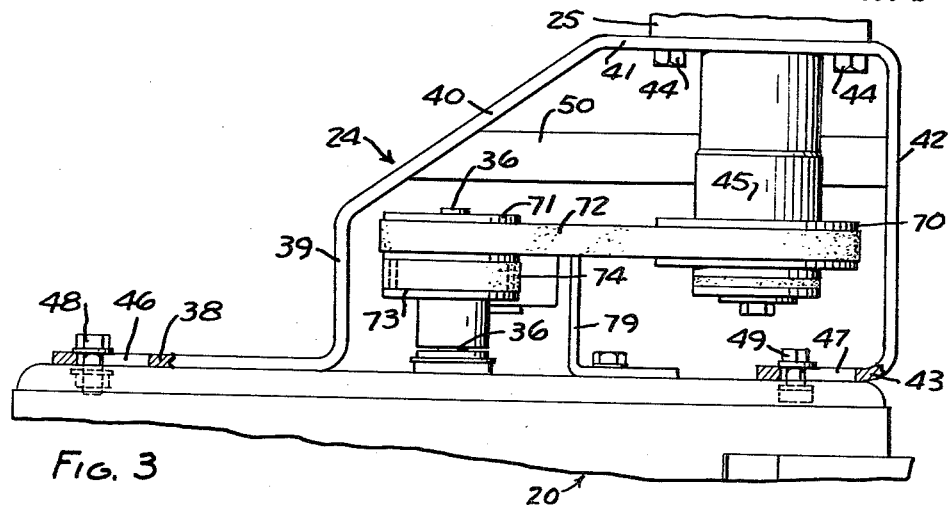
Fig. 3 is a fragmentary elevational view on an enlarged scale of the driving connection between the engine and the rotary blades.

The rotary blades are rotated by the engine 25 which is supported on the bracket 24. As shown in Fig. 3, the bracket 24 is of generally inverted U shape and comprises a horizontal base flange 38 connected to a short upstanding leg 39 which, in turn, is connected to an inclined portion 40 extending to a horizontal platform 41. A vertical leg 42 extends downwardly from the horizontal platform 41 to a base flange 43. The motor is mounted on the platform 41 by means of bolts 44, with the driveshaft 45 of the motor extending downwardly through an opening in the platform 41. The flanges 38 and 43 are provided with elongated slots 46, 47, respectively, through which bolts 48, 49 extend for fixing the position of the bracket on the housing 20 (Figs. 2, 3). Straps 50 are provided between the inclined portion 40 and leg 42 to strengthen the bracket.

Figure 4:
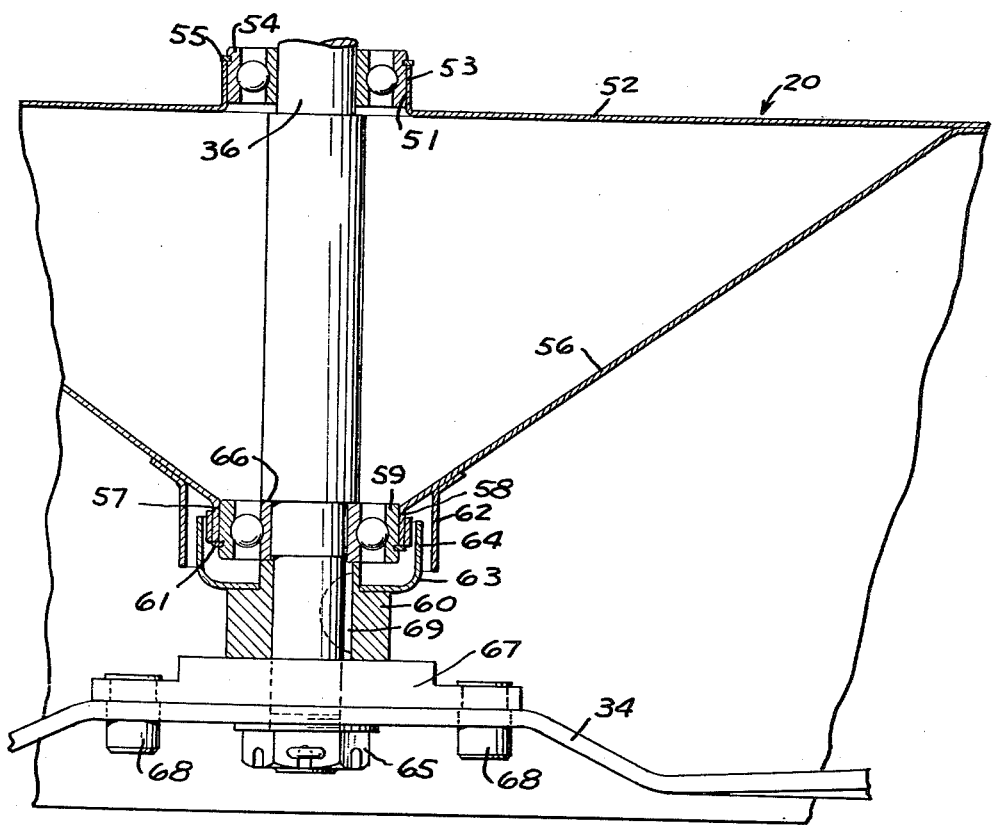
Fig. 4 is a fragmentary sectional view on an enlarged scale taken along the line 4—4 in Fig. 6.

Each of the vertical shafts 36, 37, on which rotary blades 34, 35 are mounted, is journalled in the housing 20 by an identical structure. Fig. 4 shows the structure for journalling shaft 36 in the housing 20. As shown in Fig. 4, shaft 36 extends through an opening 51 in top wall 52 of the housing 20. The top wall 52 includes an upstanding lip 53 surrounding the opening 51. A bearing 54 is mounted in the opening 51 and rotatably supports the upper end of the shaft 36. The bearing 54 is maintained in position by a split ring retainer 55. A wall 56 surrounds the shaft 36 and has an inverted coneshaped configuration providing an opening 57 at the lower or apex end of the inverted conical wall 56 through which the lower end of the shaft 36 projects. The flanged upper end of wall 56 is fixed to top wall 52 of housing 20 as by spot welding. A downwardly extending lip 58 surrounds the opening 57 and a bearing 59 is positioned in the opening for rotatably supporting the lower end of the shaft 36. A spacer block 60 is keyed to the shaft 36 below bearing 59 and maintains the bearing in position axially of the shaft. A split ring retainer 61 locks the bearing in position.

In order to prevent the entry of grass or dirt into the lower bearing 59, a downwardly extending shield 62 is mounted on the conical wall 56 and extends downwardly around the bearing. A cup 63 is mounted on the spacer block 60 and has the peripheral wall 64 thereof extending upwardly between the bearing and shield 62. The shaft 36 is formed with a shoulder 66 against which the bearing 59 bears. A flat plate 67 is welded to the lower end of the block 60 and is provided with downwardly projecting drive pins 68 which extend through holes in the rotary blade 34. A nut 65 threaded on the lower end of the shaft 36 clamps the inner race of the bearing 59 against the shoulder of the shaft by forcing the blade 34, plate 67 and block 60 against the bearing 59. The spacer block 60 is prevented from rotation relative to shaft 36 by key 69 and, in turn, prevents the blade 34 from rotating relative to the shaft.

As shown in Fig. 3, a pulley 70 is mounted on the lower end of the drive shaft 45 of the engine and is operatively connected to shaft 36 by a pulley 71 mounted on the upper end of shaft 36 and an endless belt 72 trained over the pulleys 70 and 71, so that when the engine is operated the shaft 36 is rotated. Another pulley 73 is mounted on the shaft 36 below the pulley 71 and is provided with teeth or cogs 74. A similar pulley 75 is mounted on the upper end of the other vertical shaft 37 and an endless belt 76 having teeth or cogs 77 on the inner periphery thereof is trained over the cog pulleys 74, 75 (Figs. 3, 5).

As shown in Figs. 2 and 5, a roller 78 is provided in rolling contact with the outer periphery of the cog belt 76 to maintain tension on the cog belt. The roller 78 is supported on an arm 79 which is bolted to the top of the housing 20 by a bolt 80 extending through an elongated slot 81 on the arm 79.

By the above arrangement, when the engine is operated the vertical shaft 36 is rotated and, in turn, the vertical shaft 37 is rotated. The shaft 36 and shaft 37 rotate in timed relationship because of the use of the cogged pulleys 73, 75 and cogged belt 76. The tension on the belt 72 may be varied by loosening the bolts 48, 49 and adjusting the position of the bracket 24 which supports the engine 25. Tension on the cogged belt 76 may be varied by loosening the bolt 80 and adjusting the position of the arm 79.

Figure 6:
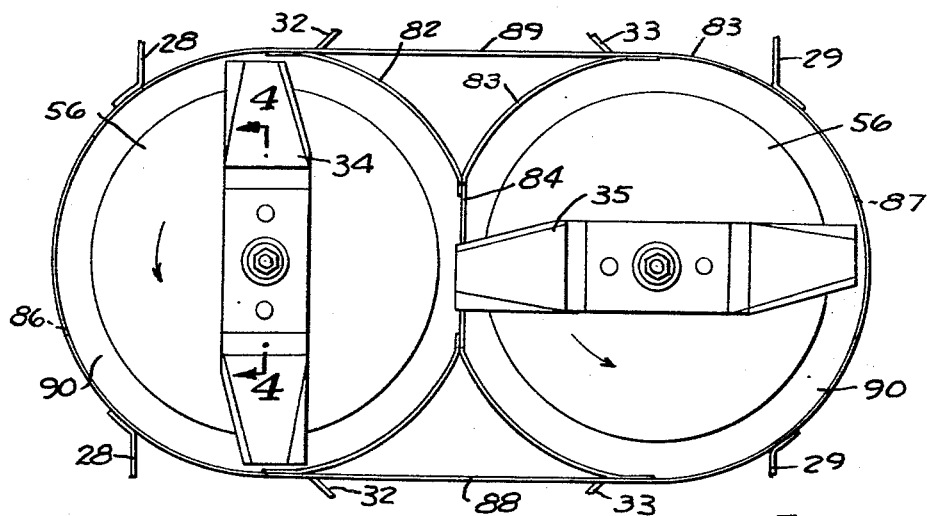
Fig. 6 is a bottom plan view of the portion of the lawn mower shown in Fig. 5.
Figure 7:
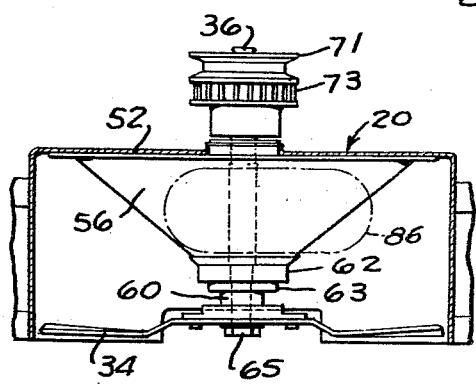
Fig. 7 is a fragmentary horizontal sectional view taken along the lines 7—7 in Fig. 8.

Referring to Fig. 6, the housing 20 comprises a vertical cylindrical wall 82 and a vertical cylindrical wall 83 which have a common flat vertical or chordal wall 84. The inner diameter of the walls 82 and 83 is slightly greater than the length of the rotary blades which rotate in the circular chambers 90 formed by these walls so that the vertical circular walls 82, 83 surround the paths or orbits of the rotary blades in close proximity thereto.

Figure 8:
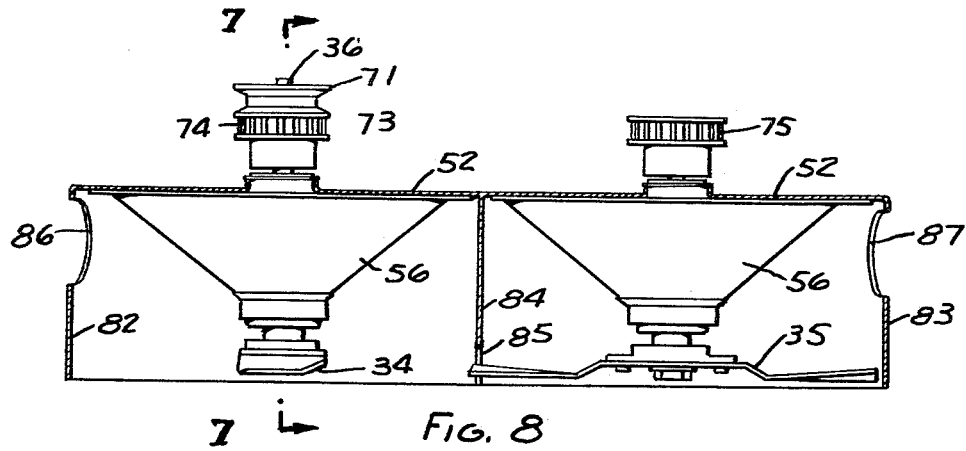
Fig. 8 is a horizontal sectional view taken along the line 8—8 in Fig. 5.

As shown in Fig. 8, the common vertical wall 84 has the lower portion thereof cut away as at 85 to permit the ends of the cutting blades to project through the wall as the blades are rotated. The rotary blades are rotated in a clockwise direction when viewed from above the mower. The circular walls 82, 83 are each provided with outlet openings 86, 87, respectively, at areas generally diametrically opposite the flat vertical wall 84 and near the upper ends thereof in close proximity to the top 52 of the housing. Front and back vertical plates 88, 89 (Fig. 6) may be provided between the circular walls to strengthen the housing. Outlet opening 86 is positioned slightly forwardly of the central transverse axis of the housing and outlet opening 87 is positioned slightly rearwardly of the central transverse axis of the housing. Thus, each opening is positioned in the side of the housing in an area nearest the end of the housing after the rotary blade on that side of the housing has passed the end of the housing (Fig. 6).

The operation of the lawn mower may be summarized as follows: When the engine 25 is operated the rotary blades 34, 35 are continuously rotated with the orbits thereof in overlapping relationship. The timed relationship of the blades is insured by the cogged pulleys 73, 75 and the cogged belt 76 whereby the blades can rotate in the same plane with the orbits of the blade tips overlapping without contacting. The rotary blades are preferably positioned at 90° to each other. As the lawn mower is guided along the ground by means of the handle 26, the blades of grass are subjected to a vacuum caused by the rotation of the blades 34, 35 and tending to raise the blades of grass to an erect position. The grass is cut by the rotation of the blades and the grass cuttings are caused by the vacuum to rise in the housing and be repeatedly subjected to further cutting and carried around a circular path by rotation of the blades until they are sufficiently small and light to be ejected by the vacuum action through the outlet openings 86 and 87. The provision of a vertical wall 84 between the circular walls 82, 83 provides for subjecting the grass below each of the blades to an isolated vacuum. By having the cylindrical walls 82, 83 spaced closely to the ends of the rotary blades, a high velocity air stream is induced in each circular chamber, the air entering at the open bottom and being discharged through the elevated openings 86, 87. This upwardly flowing air stream elevates the grass cuttings in each chamber and tends to discharge them in an upwardly direction through openings 86, 87. Since the cuttings are discharged while being elevated, they are scattered over a wide area and no windrowing of the grass cuttings results. A conical wall 56 above each of the rotary blades serves to direct the upward moving cuttings toward the outer walls of the housing and thus out of the outlet openings 86 and 87. The conical walls 56 thus facilitate the movement of the grass cuttings toward the outlet openings and thus prevent them from collecting along the top wall of the housing as might occur if the grass were heavy and wet.

The overlapping of the blade orbits permits a wide continuous swath to be cut by a single movement of the lawn mower without increasing the overall length of the lawn mower. No uncut grass is left at the center of the swath and both blades cut the grass at the same height. The resultant mower is compact and easily handled. Furthermore, since the distance between the front and rear axles 31 is relatively short, scalping or slicing off of the high spots on uneven ground is avoided.

Since the halves of the housing are identical, the lawn mower may be operated with equal facility in either direction.

I claim:

1. In a lawn mower, the combination comprising a housing, said housing including a pair of generally cylindrical vertical walls positioned side by side, an imperforate flat top wall closing the upper end of each cylindrical wall, said cylindrical vertical walls intersecting in a common chordal wall, a vertical shaft mounted on each said top wall for rotation about the axis of each said cylindrical wall, a rotary blade mounted on the lower end of each said shaft for rotation within said housing, each said blade having a cutting edge and means thereon for producing an air current upwardly through the plane of rotation when the blade is rotated, the paths of rotation of said blades lying in the same plane, the lower edge of said cylindrical walls extending downwardly below the plane of rotation, the length of said blades being such that the paths thereof overlap in an area through the plane of said common wall, said common chordal wall being substantially imperforate and extending downwardly toward the plane of rotation of said blades and terminating adjacent the plane of rotation of said blades whereby the lower edge of said chordal wall is spaced vertically from the lower edges of said cylindrical walls sufficiently to provide clearance for the ends of the blades, means for rotating said blades in timed relationship, each said cylindrical wall being provided with a discharge opening and being otherwise generally imperforate, and means for supporting said housing for movement along the ground in a direction substantially perpendicular to the plane containing said shafts.

2. The combination set forth in claim 1 wherein said common chordal wall extends substantially vertically and in the direction of movement of said housing along the ground.

3. The combination set forth in claim 1 wherein said common chordal wall is substantially flat.

4. The combination set forth in claim 1 wherein said discharge opening in each said cylindrical wall is positioned in an area substantially diametrically opposite said common chordal wall.

5. The combination set forth in claim 4 wherein each said discharge opening is positioned near the upper end of its respective cylindrical wall.

6. In a lawn mower, the combination comprising a housing having a top wall and a peripheral wall extending downwardly from said top wall, a pair of vertical shafts rotatably mounted on said housing, a rotary blade mounted on the lower end of each shaft for rotation within said housing, each said blade having a cutting edge and means thereon for producing an air current upwardly through the plane of rotation when the blade is rotated, the length of said blades being such that the paths thereof overlap, a substantially vertical imperforate wall extending across said housing in a direction at substantially right angles to a plane containing said shafts, said vertical wall extending from the top wall downwardly toward the planes of rotation of said blades and terminating adjacent the plane of rotation of said blades in the area where the paths of said blades overlap whereby the lower edge of said vertical wall is spaced vertically from the lower edge of said peripheral wall to provide clearance for the ends of the blades, said housing being formed with a discharge opening on each side of said vertical wall and being otherwise generally imperforate, and means for supporting said housing for movement along the ground in a direction substantially parallel to the plane of said vertical wall.

References Cited in the file of this patent

UNITED STATES PATENTS

| | | |
|---|---|---|
| 2,188,110 | Fahnestock | Jan. 23, 1940 |
| 2,681,536 | Kuhary et al. | June 22, 1954 |
| 2,706,879 | Barrentine | Apr. 26, 1955 |
| 2,720,742 | Hilton | Oct. 18, 1955 |
| 2,726,503 | Phelps | Dec. 13, 1955 |